No. 636,435. Patented Nov. 7, 1899.
J. E. KERSHAW.
PROTECTING SHEATH FOR PNEUMATIC TIRES.
(Application filed Jan. 9, 1899.)

(No Model.)

Witnesses
JD Thorne
M. A. Millward

Inventor
James E. Kershaw,
by John Elias Jones,
his Attorney.

UNITED STATES PATENT OFFICE.

JAMES E. KERSHAW, OF COVINGTON, KENTUCKY.

PROTECTING-SHEATH FOR PNEUMATIC TIRES.

SPECIFICATION forming part of Letters Patent No. 636,435, dated November 7, 1899.

Application filed January 9, 1899. Serial No. 701,670. (No model.)

*To all whom it may concern:*

Be it known that I, JAMES E. KERSHAW, a citizen of the United States, residing at Covington, in the county of Kenton and State of Kentucky, have invented certain new and useful Improvements in Pneumatic Tires; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to protecting-sheaths for pneumatic or other tires.

The object of the invention is to provide a protecting-sheath for pneumatic or other tires which is of simple construction and efficient in use.

A further object of the invention is to provide a protecting-sheath which efficiently protects the tire from puncture without lessening or interfering with the resiliency of the tire.

A further object of the invention is to provide a protecting-sheath which may be readily applied at any time to a tire of any make or style of construction.

Other objects of the invention will appear more fully hereinafter.

The invention consists, substantially, in the construction, combination, location, and arrangement of parts, all as will be more fully hereinafter set forth, as shown in the accompanying drawings, and finally specifically pointed out in the appended claims.

Figure 1:
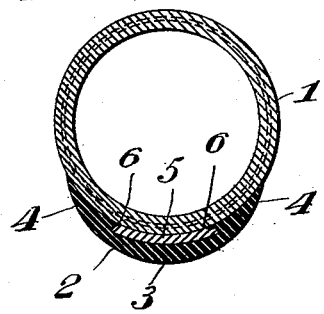
Figure 2:
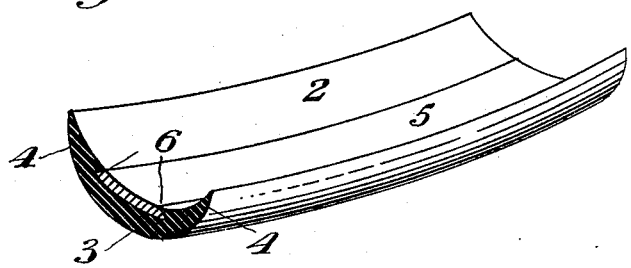
Figure 3:
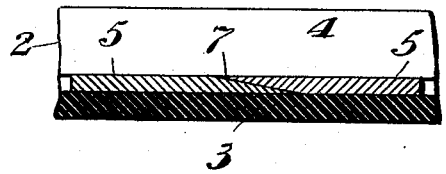
Figure 4:
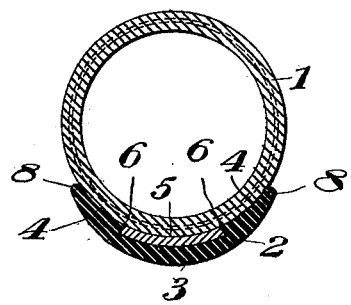

Referring to the accompanying drawings and to the various views and reference-signs appearing thereon, Figure 1 is a transverse section of a pneumatic tire, showing a protecting-sheath embodying the principles of the invention applied thereto. Fig. 2 is a view, slightly in perspective, of a portion of the protecting-sheath detached from the tire. Fig. 3 is a broken view, in longitudinal section, of the protecting-sheath. Fig. 4 is a view similar to Fig. 1, showing a slightly-modified form of the invention.

The same part is designated by the same reference-sign wherever it occurs throughout the several views.

Reference-sign 1 designates a tire which in the particular form shown comprises an ordinary single-tube pneumatic tire. It is obvious, however, that the invention is equally applicable to tires of any style or make, that form shown being merely illustrative of the principles of the invention.

The protecting-sheath embodying the invention is designated generally by reference-sign 2 and comprises a supplemental piece or strip of rubber or other suitable elastic material. In order that the sheath may be applied to the tread of the tire, it is made, preferably, of crescent shape in cross-section, its inner surface being concave to fit the contour of the tread of the tire to which the sheath is to be applied, and its outer surface, which contacts with the ground, being made convex. When the sheath is applied to the tread of the tire, the central thickened portion 3 overlies and protects the tread portion of the tire, while the tapering side flanges 4 of the sheath, which closely fit and conform in shape to the shape of the sides of the tire, not only afford an efficient contacting surface for the attachment of the sheath to the tire, but also serve to strengthen and protect the portions of the tire on opposite sides of the tread.

On the inner concave surface of the sheath 2 is formed a central seat or groove extending longitudinally of the sheath, and in said seat or groove is adapted to be received a thin flat strip or sheet 5 of pliable inelastic material—such, for instance, as rawhide, compressed corn-pith, cellulose, or the like. This strip should be of a sufficient width to cover the tread portion of the tire, and by arranging said strip or sheet in a seat or groove in the inner or concave surface of the sheath it is brought directly into contact with the surface of the tread of the tire and efficiently protects the tire from puncture.

The strip or sheet 5 may be secured in its seat or channel in the inner surface of the supplemental piece 2 in any suitable manner, as by cementing the same therein. In practice I prefer to form the side walls 6 of the recess or seat slightly undercut, as clearly shown, whereby the strip or sheet 5 may be efficiently held and retained in place.

In order that the ends of the strip or sheet may be brought into suitable relation for securing together and without unduly increasing the thickness of the strip at the joint, said ends may be suitably tapered and arranged to overlap each other, as clearly shown in Fig. 3.

If desired and in order to impart greater elasticity to the side flanges 4 of the supplemental piece 2, the edges thereof may be made rounding, as indicated at 8, Fig. 4.

By the construction above described it will be seen that I provide an exceedingly simple and efficient protecting-sheath which may be readily and easily applied to any tire of any style or make and whether the tire has been used or is new. It will also be seen that I avoid the use of a metallic armor, which not only lessens or destroys the resiliency of the tire, but also endangers the life of the tire by reason of the edges of a metallic strip cutting through the sides of the tire in case of a partial deflation of the tire. It will also be seen that by employing a suitable pliable inelastic material, such as rawhide or the like, the strip or sheet will readily yield with the tire or the supplemental piece, thus not only avoiding danger of the edges thereof cutting through and injuring the tire, but also avoiding any interference with or decrease in the resiliency of the tire. Moreover, by reason of the pliant inelastic nature of the protecting strip or sheet injury to the tire through dents formed in the strip by the wheel passing over stones or the like, as in the case of a metal armor, is also avoided, and consequently the life of the tire, as well as its security against puncture, is increased.

The protecting-sheath is secured to the tire in any suitable manner, as by cementing the same thereto, and by inflating the tire after the sheath is applied thereto the sheath will be securely held in place by the elasticity of the material out of which it is made.

By first molding or otherwise forming the supplemental piece with the seat or groove in its inner surface the strip or sheet of rawhide or the like may then be readily and easily placed in such seat or groove without incurring the danger of injury thereto by molding the supplemental piece about the strip or sheet.

It is obvious that many variations and changes in the details of construction and arrangement would readily occur to persons skilled in the art and still fall within the spirit and scope of my invention. I do not desire, therefore, to be limited or restricted to the exact details of construction and arrangement shown and described; but, Having now set forth the objects and nature of my invention and a form of construction embodying the principles thereof and having explained the purpose and function thereof, what I claim as new and useful and of my own invention, and desire to secure by Letters Patent of the United States, is—

1. As a new article of manufacture, a protecting-sheath adapted to be applied to the tread of any pneumatic or other tire, and comprising a supplemental piece of rubber or similar material, crescent-shaped, in cross-section, thereby presenting a convexed outer surface and a concaved inner surface to conform to the contour of the tire, and having sides of diminishing thickness, and a strip or sheet of rawhide adapted to be received on the inner concaved surface of said supplemental piece and interposed between said supplemental piece and the surface of the tread of the tire, as and for the purpose set forth.

2. As a new article of manufacture, a protecting-sheath adapted to be applied to the tread of any tire, and comprising a supplemental piece of rubber or other suitable material, crescent-shaped in cross-section, thereby presenting a convexed outer surface and a concaved inner surface to conform to the contour of the tire, said supplemental piece having a central longitudinal channel or groove with undercut side walls in the inner or concave surface thereof, and a strip or sheet of rawhide adapted to be received in said channel or groove and retained therein by said undercut side walls, said strip of rawhide contacting with and covering the tread-surface of the tire to protect the same from puncture, as and for the purpose set forth.

In testimony whereof I affix my signature in presence of two witnesses.

JAMES E. KERSHAW.

Witnesses:
JOHN ELIAS JONES,
B. KERSHAW.